No. 777,339. PATENTED DEC. 13, 1904.
N. B. GAMBLE.
STALK RAKE.
APPLICATION FILED JUNE 24, 1904.
NO MODEL. 2 SHEETS—SHEET 1.
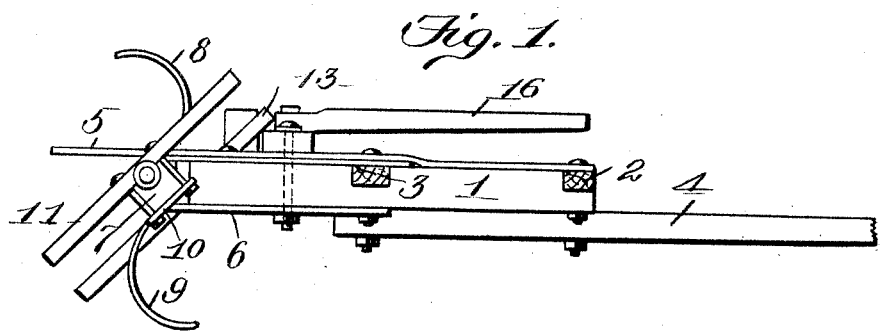
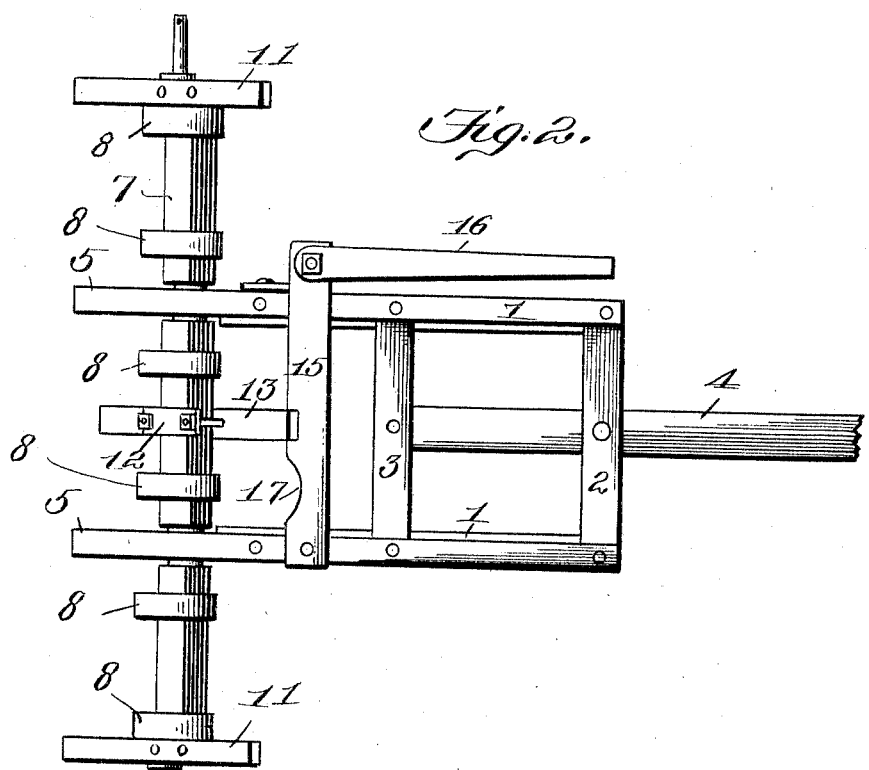
Witnesses
C. D. Kesler,
Inventor
Neill B. Gamble
By James L. Norris
Atty.

No. 777,339. PATENTED DEC. 13, 1904.
N. B. GAMBLE.
STALK RAKE.
APPLICATION FILED JUNE 24, 1904.
NO MODEL.
2 SHEETS—SHEET 2.
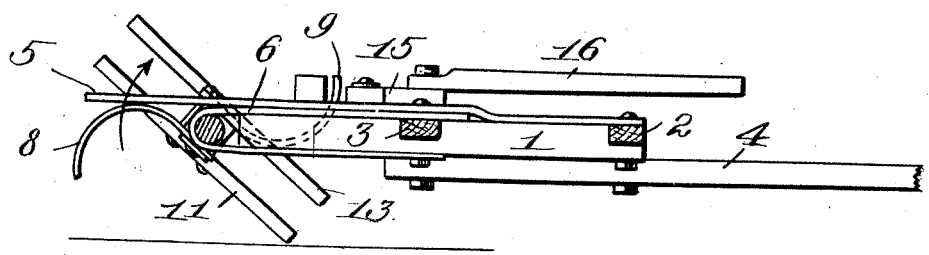
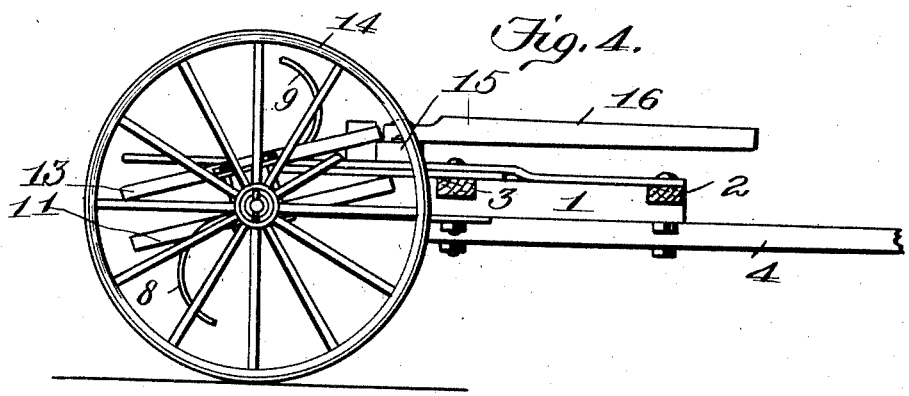

No. 777,339. Patented December 13, 1904.

UNITED STATES PATENT OFFICE.

NEILL B. GAMBLE, OF SAN GABRIEL, TEXAS.

STALK-RAKE.

SPECIFICATION forming part of Letters Patent No. 777,339, dated December 13, 1904.

Application filed June 24, 1904. Serial No. 214,041. (No model.)

*To all whom it may concern:*

Be it known that I, NEILL B. GAMBLE, a citizen of the United States, residing at San Gabriel, in the county of Milam and State of Texas, have invented new and useful Improvements in Stalk-Rakes, of which the following is a specification.

This invention relates to stalk-rakes, and has for its object to provide a rake particularly adapted for raking up cotton and cornstalks, sorghum-cane, cleaning up land, and for general raking purposes.

The invention further aims to construct a stalk-rake which is simple in its construction, strong, durable, efficient in its use, readily set up, and comparatively inexpensive to manufacture.

With the foregoing and other objects in view the invention consists of the novel combination and arrangement of parts hereinafter more specifically described, illustrated in the accompanying drawings, and particularly pointed out in the claim hereunto appended.

In describing the invention in detail reference is had to the accompanying drawings, forming a part of this specification, wherein like reference characters denote corresponding parts throughout the several views, and in which—

Figure 1 is a side elevation of the rake in its operative position. Fig. 2 is a plan view. Fig. 3 shows the rake in the act of dumping, and Fig. 4 is a view when transporting the rake.

The rake comprises a supporting-frame, and said frame consists of a pair of side bars 1, the front cross-bar 2, and the rear cross-bar 3. The bar 2 is secured to the side bars 1 at the front thereof, and the bar 3 is secured to the side bars 1 at a point removed from the rear end thereof, or, in other words, the cross-bar 3 is secured to the side bars 1 approximately centrally thereof. Connected to the cross-bars 2 3 by any suitable holdfast devices is a forwardly-projecting tongue 4, which is adapted to be attached in a known manner to a draft device, preferably the fore axle of a vehicle.

Mounted upon as well as being secured to the top of the side bars 1 by suitable holdfast devices is a pair of rearwardly-extending clearance-arms 5, which project over the tines-supporting shaft, to be hereinafter referred to. The function of the arms 5 is to clear the tines of gathered material during the dumping operation.

Connected with the side bars 1 of the frame through the medium of a pair of retaining-yokes 6, which are secured to and project rearwardly from the side bars 1, is a transversely-extending rotatable tines-supporting shaft 7, preferably square in cross-section, and which has secured thereto by suitable holdfast devices two series of curvilinear metallic tines 8 9, the series of tines 8 extending in an opposite direction with respect to the series of tines 9.

Attached to the shaft 7 at each end of the series of tines 8 through the medium of the holdfast devices 10 is a dumping-bar 11, and attached to the shaft 7, intermediate the ends of the series of tines 9, through the medium of the holdfast device 12, is a combined stop and dumping-bar 13. The dumping-bars 11 and 13 project forwardly and rearwardly of the shaft 7, and the function thereof is to impinge against the ground and cause the rotation of the shaft 7, thereby dumping the material gathered by the tines. The material during the dumping operation is also cleared from the tines through the medium of the clearance-arms 5. The combined stop and dumping-bar 13 not only assists in the rotation of the shaft 7 to cause the dumping of the material, but also acts as a stop to prevent rotation of the shaft 7. The manner in which the bar 13 acts as a stop will be hereinafter referred to. At each end of the shaft 7 a detachable transporting-wheel 14 is secured to assist in transporting the rake from field to field; but when the rake is in operation the wheels 14 are detached.

Pivotally secured to the top of the supporting-frame near its rear end is one end of a trip-arm 15, which has its opposite end pivotally connected to a forwardly-extending operating-lever 16. When the arm 15 is in its normal position—that is, extending transversely of the supporting-frame—the same is engaged by the bar 13, consequently arresting the movement of the said bar, and thereby retaining the shaft 7 stationary; but when the lever 16 is moved forwardly it carries said arm 15 therewith, and said arm 15 is then moved out of the path of the bar 13 to allow movement of said bar 13 and the shaft 7. The stop-arm 15 is notched, as at 17, to permit of the passage of a pair of the tines when said arm 15 is moved out of the path of the bar 13. The constructing of the tines in a curvilinear manner increases the holding capacity thereof, and the constructing of the tines from metallic material makes them yielding, so as to cause the travel of the rake smoothly when meeting with an obstruction during the raking.

The manner in which the rake is used preferably is to attach it to the fore axle of a vehicle and then drag it over the ground to gather the material which is to be raked up. When the operator gets ready to dump, the lever is pulled, so as to move the arm 15 out of the path of the bar 13. The dumping-bars catch on the ground and revolve the shaft 7, consequently dumping the material from the tines. The arm 15 is then moved to its normal position—that is, in the path of the bar 13—and the series of tines which has not been in operation is then placed into operation to do the raking. In lieu of attaching the rake to the fore axle of a vehicle it can be attached to any suitable draft means.

It is thought the many advantages of a stalk-rake constructed in accordance with the foregoing description, taken in connection with the accompanying drawings, can be readily understood, and it will furthermore be evident that changes, variations, and modifications can be resorted to without departing from the spirit of my invention or sacrificing any of its advantages, and I therefore do not wish to restrict myself to the details of construction hereinbefore described, and set forth in the annexed drawings, but reserve the right to make such changes, variations, and modifications as come properly within the scope of the protection prayed.

Having thus fully described my invention, what I claim as new, and desire to secure by Letters Patent, is—

A stalk-rake comprising a drag-frame, a rotatable shaft connected to the rear thereof, a pair of clearance-arms secured to said frame at the rear at each side thereof and projecting rearwardly over and beyond said shaft, a combined stop and dumping-bar carried by said shaft intermediate the ends thereof, a dumping-bar secured to said shaft at each end thereof and upon the side opposite to that to which said combined stop and dumping-bar is secured, a trip-lever carried by said frame and adapted to be engaged by said combined stop and dumping-bar to prevent the rotation of said shaft, a series of curvilinear yielding tines carried by said shaft, and a series of curvilinear yielding tines carried by said shaft and extended in opposite direction with respect to the first-mentioned series of tines, substantially as described.

In testimony whereof I have hereunto set my hand in presence of two subscribing witnesses.

NEILL B. GAMBLE.

Witnesses:
M. E. LINCOLN,
W. H. CLARK.